United States Patent
Hersbach et al.

(10) Patent No.: US 11,144,716 B2
(45) Date of Patent: Oct. 12, 2021

(54) STORABLE AND PLATFORM AGNOSTIC FIELD FORMATTING

(71) Applicant: PAYPAL, INC., San Jose, CA (US)

(72) Inventors: Willem Hermanus Georgius Hersbach, Vancouver (CA); Willian Mews, Vancouver (CA); Blair Michael Olynyk, Maple Ridge (CA)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/688,830

(22) Filed: Nov. 19, 2019

(65) Prior Publication Data

US 2021/0149991 A1    May 20, 2021

(51) Int. Cl.
*G06F 40/174* (2020.01)
*G06F 40/103* (2020.01)
*G06F 40/205* (2020.01)

(52) U.S. Cl.
CPC .......... *G06F 40/174* (2020.01); *G06F 40/103* (2020.01); *G06F 40/205* (2020.01)

(58) Field of Classification Search
CPC ..... G06F 40/174; G06F 40/103; G06F 40/205
See application file for complete search history.

(56) References Cited

U.S. PATENT DOCUMENTS

| | | | | |
|---|---|---|---|---|
| 6,243,711 B1* | 6/2001 | Wu | ......................... | G06F 9/451 |
| 7,251,782 B1* | 7/2007 | Albers | ................... | G06F 3/0481 |
| | | | | 715/708 |
| 7,702,724 B1* | 4/2010 | Brydon | .................... | H04L 67/02 |
| | | | | 709/203 |
| 8,826,115 B2* | 9/2014 | Raje | ....................... | G06F 40/174 |
| | | | | 715/222 |
| 2002/0113810 A1* | 8/2002 | Radtke | ................ | G06F 3/04895 |
| | | | | 715/710 |
| 2014/0344232 A1* | 11/2014 | Kludy | ................... | G06F 40/174 |
| | | | | 707/694 |
| 2017/0353482 A1* | 12/2017 | Sommer | .................. | H04L 63/20 |
| 2018/0239959 A1* | 8/2018 | Bui | ........................ | G06F 40/103 |

(Continued)

OTHER PUBLICATIONS

Janko Jovanovic, "Web Form Validation: Best Practices and Tutorials", Jul. 7, 2009, Retrieved from internet, URL:< https://www.smashingmagazine.com/2009/07/web-form-validation-best-practices-and-tutorials>, 30 pages.

(Continued)

*Primary Examiner* — Thu V Huynh
(74) *Attorney, Agent, or Firm* — Haynes and Boone, LLP

(57) ABSTRACT

Methods and systems are presented for dynamically generating programming code for implementing input data fields that automatically verifies formatting of input data based on platform agnostic formatting rules. A user interface page is obtained for display on a user device, wherein the user interface page is configured to obtain data from a user. Based on first programming code associated with the interface page, formatting rules are retrieved from a remote server. Second programming code that implements one or more input data fields on the user interface page is generated based on the formatting rules. The user interface page with the one or more input data fields is rendered on the user device for obtaining user data. Based on the second programming code, the user data inserted into the one or more input data fields is automatically formatted.

20 Claims, 8 Drawing Sheets

(56) References Cited

U.S. PATENT DOCUMENTS

2019/0087398 A1* 3/2019 Kolesov ............... G06F 40/106
2020/0110795 A1* 4/2020 Gupta ................. G06F 16/285

OTHER PUBLICATIONS

"Angular—Form Validation", Sep. 6, 2019, Retrieved from internet, URL:< https://angular.io/guide/form-validation >, 18 pages.

"Marmot Manual—Validating Form Data", Sep. 6, 2019, Retrieved from internet, URL:<netapps.miamioh.edu/marmot/docs/presentation.forms.validating.html>, 5 pages.

"Angular How-to: Share Server-side Validation", Premier Developer, Sep. 6, 2019, Retrieved from internet, < https://devblogs.microsoft.com/premier-developer/angular-how-to-share-server-side-validation/>, 13 pages.

"Manual—How to Process Submitted Data", Sep. 6, 2019, Retrieved from internet, <https://pear.php.net/manual/en/package.html.html-quickform.intro-validation.php >, 9 pages.

"Angular—Reactive Forms", Sep. 6, 2019, Retrieved from internet, URL:< https://angular.io/guide/reactive-forms >, 30 pages.

"Client side and Server side Validation Rule—Answers—Salesforce Trailblazer Community", Sep. 6, 2019, Retrieved from internet, <https://success.salesforce.com/answers?id=9063A000000pWoBQAU >, 3 pages.

"Server-side form Validation", Joomla! Documentation, Retrieved from internet, URL:<https://docs.joomla.org/Server-side_form_validation>, 6 pages.

* cited by examiner

```
{
    "category": "ACCOUNT",
    "dataType": "NUMBER",
    "isEditable": true,
    "label": "Account Number",
    "maxLength": 17,
    "minLength": 4,
    "name": "bankAccountId",
    "placeholder": "",
    "regularExpression": "^(?![0-]+$)[0-9-]{4,17}$",
    "isRequired": true,
    "validationMessage": {
        "length": "The minimum length of this field is 4 and maximum length is 17.",
        "pattern": "is invalid length or format.",
        "empty": "You must provide a value for this field"
    }, // here is the mask for the Account Number field:
    "mask": { "conditionalPatterns": [
        { "pattern": "#### #### #### ####", "regex": "^4" },
        { "pattern": "##### ##### ##### #####", "regex": "^5[1-5]" },
        { "pattern": "#### ###### #####", "regex": "^3[47]" },
        { "pattern": "###### #### #### ####", "regex": "^[3|4|5]" }
    ], "defaultPattern": "#### ##### ##### ###",
    "scrubRegex": "\\\\s" }
```

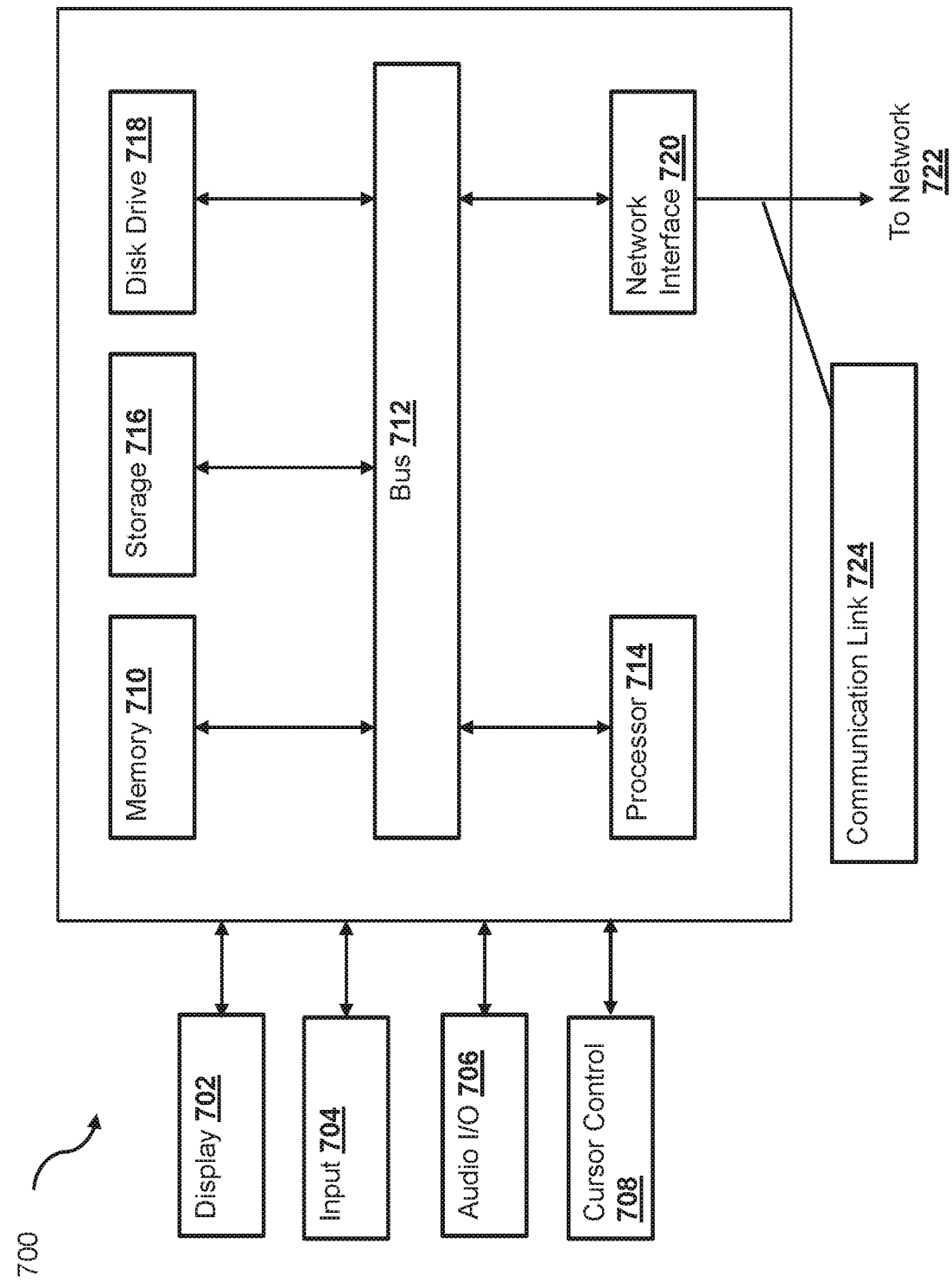

STORABLE AND PLATFORM AGNOSTIC FIELD FORMATTING

BACKGROUND

The present specification generally relates to electronic user interfaces, and more specifically, to dynamically generating data fields in electronic user interfaces based on platform agnostic field formatting according to various embodiments of the disclosure.

RELATED ART

The increasing amount of transactions being conducted electronically has put more stress than ever on computer servers of organizations configured to facilitate the electronic transactions. These computer servers are responsive to various types of electronic requests, such as requests for content, transaction requests, etc. submitted by user devices. Each time a request is received by one of the computer servers, processing power and time are consumed to process the request. Even when erroneous data (e.g., incorrect transaction data) is submitted in a request, the computer server(s) still uses processing power and time to process the request and transmit an error message back to the user device. The processing of erroneous data causes unnecessary network traffic and wasted processing power for the computer servers, which takes away the processing power and time for servicing other requests. Furthermore, when a computer server receives data provided by a user through an input field of a website, it is often unclear what the computer server should expect, as different users may use different formats to enter the data. For example, when a user enters a social security number, the user may enter it without space or dashes (e.g., 123456789) or the user may enter it with dashes (123-45-6789). Thus, there is a need for automatically formatting and verifying data at user devices before the data is submitted to the server.

BRIEF DESCRIPTION OF THE FIGURES

FIG. 4 illustrates exemplary platform agnostic field formatting code according to an embodiment of the present disclosure;

FIG. 6 illustrates another exemplary user interface page that is dynamically generated using platform agnostic field formatting code according to an embodiment of the present disclosure; and FIG. 7 is a block diagram of a system for implementing a device according to an embodiment of the present disclosure.

Figure 1:
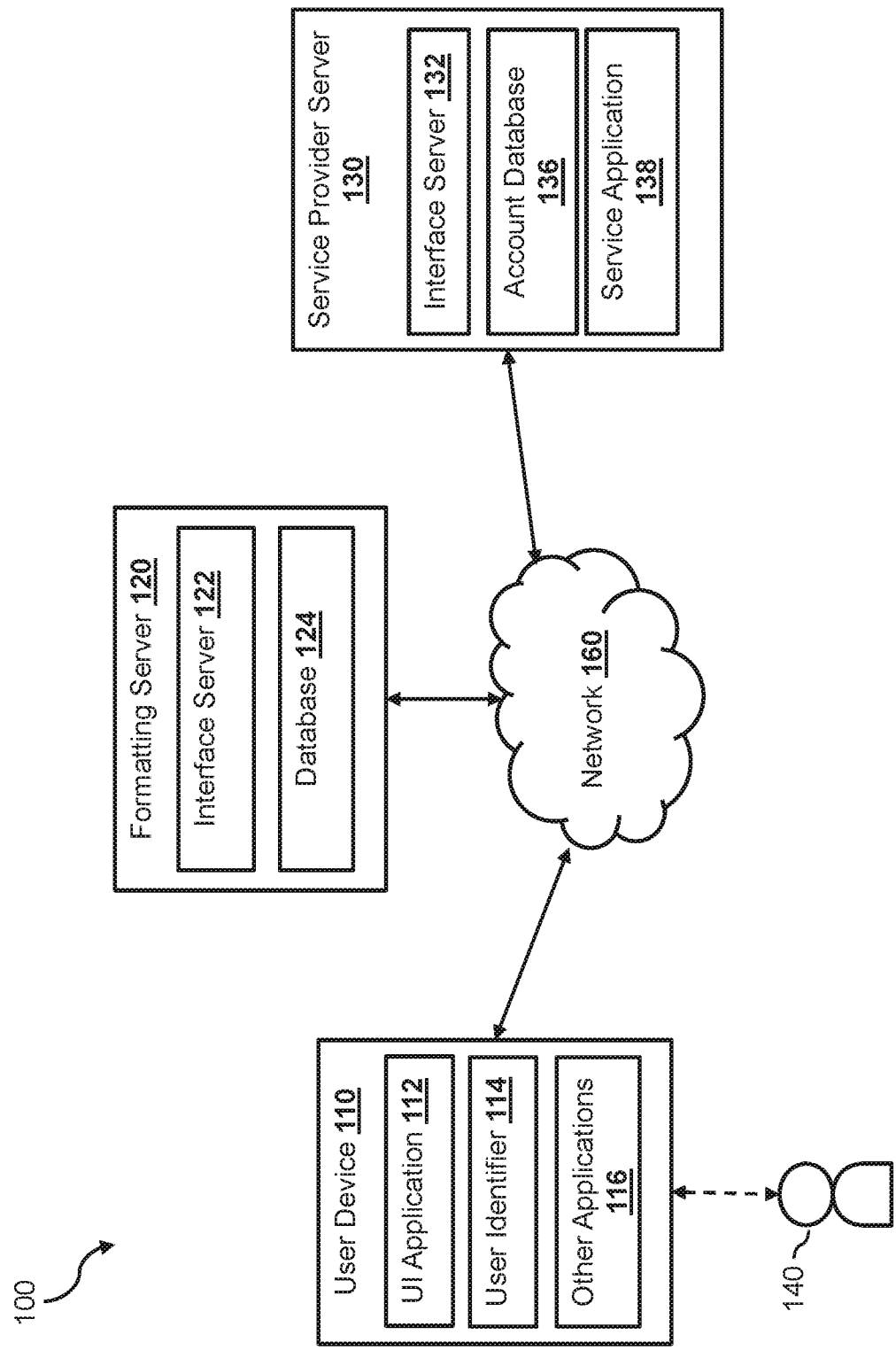
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for dynamically generating programming code for implementing input data fields in a user interface that automatically formats and verifies formatting of input data based on platform agnostic field formatting code. As discussed above, ensuring that data provided by a user in a request is correct before the data is submitted to a computer server configured to process the request would substantially improve the performance of the computer server. Conventionally, formatting rules have been hard coded into a user interface including the data input fields (e.g., webpages, mobile application interfaces, etc.). For example, scripts using scripting language such as JavaScript® that implements the data formatting verification process may be included as part of the code associated with the user interface (e.g., as part of the HTML code).

Implementing the formatting rules on the client side relieves the burden of the computer servers and reduces unnecessary network traffic as the data can be checked and verified at the user devices before requests are transmitted to the computer server. It also reduces human error and/or expectations for entering incorrect values. For example, when the user interface is rendered on the user device, the script that implements the data formatting verification process may check the data provided by the user against the formatting rules and may prevent a request from being transmitted to the server when the data has incorrect formatting (e.g., fails one or more of the formatting rules). However, as multiple platforms (e.g., different types and versions of web browsers such as Chrome®, Safari®, Internet Explorer®, Firefox®, etc., and different mobile platforms such as iOS®, Android®, etc.) are supported by an organization, ensuring that consistent formatting rules are hard coded in the different pages corresponding to the different platforms for the same user interface can become challenging.

Furthermore, it can be appreciated by one who is skilled in the art that the formatting rules for the same type of data may vary depending on geographical regions. For example, an address in the United States may include street address, city, followed by state and zip code, where the zip code can be a five-digit number in the format (or pattern) of ##### or a nine-digit number in the format of #####-####, where each '#' represents a numeral digit. A Canadian address may also include a zip code, but in a different format from the United States. In Canada, a zip code has a format of @#@-#@# where each '@' represents an alphabet and each '#' represents a numeral digit. Australia, on the other hand, has a zip code format of ####. As such, the formatting rules for certain types of data may be complicated for supporting multiple geographical regions, which makes it challenging for the organization to ensure that proper formatting is implemented and is consistent across different user interfaces. Similarly, government issued identification card numbers also vary greatly from regions to regions.

In another example, payment card numbers (e.g., credit card numbers, debit card numbers, etc.) may also have different formats depending on the issuers of the credit cards. For example, an American Express® payment card may begin with a digit '3' and have a format of #### ###### ##### while VISA® or MasterCard® payment cards may have a card number format of #### #### #### ####. It is noted that the formatting of a piece of data (e.g., a zip code, a payment card number, etc.) includes both an arrangement of one or more numerals and/or one or more alphabet letters and also the extra characters (e.g., dash characters, space characters, slash characters, etc.) added to the data. These extra characters added to the data serve to separate the piece of data into multiple pieces, which help users to correctly input the piece of data and manually verify the data.

Thus, according to various embodiments of the disclosure, a user interface system may use platform agnostic field formatting code to dynamically generate programming code for implementing input data fields that automatically formats the input data and verifies the input data. In such a system, formatting rules need not be hard coded in each user interface pages (e.g., webpages, mobile application pages, etc.). Instead, a user interface page stored on the computer server (or on a user device) does not need to include programming code for implementing one or more input data fields but may specify the type(s) of data (e.g., a billing address, payment card information, etc.) that the user interface page is configured to obtain from users. The user interface page may also include programming code for retrieving the platform agnostic field formatting code.

In some embodiments, the platform agnostic field formatting code may include, for each type of data (e.g., each data type), information that specifies a number of different input data fields required for the type of data and formatting rules associated with each of the different input data fields. The formatting rules associated with each of the different input data fields may include one or more acceptable formats, where each format includes a length (e.g., a maximum length, a minimum length, etc.), an arrangement of one or more numerals and/or one or more alphabet letters (e.g., a pattern), any additional characters (e.g., dashes, spaces) to be inserted among the one or more numerals and/or one or more alphabet letters, and one or more restrictions (e.g., the first character must be a '3' or a '4', etc.). For example, for an address type of data, the platform agnostic field formatting code may specify that an address may include a street address input data field, a city input data field, a state input data field, a zip code input data field, and a country input data field. The platform agnostic field formatting code may also include different formatting rules for the different input data fields. For example, for the zip code input data field, the formatting rules may include one or more acceptable formats, including a format of ##### and a format of #####-#### for U.S. addresses, a format of @#@-#@# for Canadian addresses, a format of ###-### for Australian addresses, and possibly other zip code formats corresponding to other countries. In another example, for a payment card information type of data, the platform agnostic field formatting code may specify that the payment card information may include a card number input data field, a security code input data field, a cardholder name input data field, and an expiration date input data field. The platform agnostic field formatting code may also include different formatting rules for the different input data fields. For example, for the payment card number input data field, the formatting rules may include one or more acceptable formats, including a format of #### ###### ##### for American Express® payment cards and a format of #### #### #### #### for VISA® and MasterCard® payment cards.

In some embodiments, the platform agnostic field formatting code may also be stored on the computer server, or on a remote server separate from the computer server. For example, the platform agnostic field formatting code may be maintained by a third-party data formatting service and stored on a remote server associated with the third-party data formatting service. Thus, the platform agnostic field formatting code may be accessible and used by computer servers associated with different organizations for generating input data fields on various user interface pages (e.g., webpages, mobile application pages, etc.). In some embodiments, the third-party data formatting service may provide an application programming interface (API) to enable user devices, when executing and/or rendering user interface pages, to retrieve the platform agnostic field formatting code. It is noted that the platform agnostic field formatting code is agnostic to computer platforms e.g., Windows® operating system, Mac® operating system, iOS® operating system, Android® operating system, etc.) and may be implemented in a manner (e.g., implemented using XML code or in a proprietary format in a text file, etc.) that can be interpreted by any type of programming language (e.g., C++, Java®, JavaScript®, Python, C #, etc.).

Upon receiving a request for the user interface page from a user device, the computer server may transmit the user interface page to the user device. When the user interface page is executed and/or rendered at the user device, the programming code may cause the user device to retrieve the platform agnostic field formatting code from the computer server or from the remote server using the API provided by the third-party data formatting service. In some embodiments, the programming code retrieves the platform agnostic field formatting code associated with different types of data (some may be related to the type(s) of data associated with the user interface page and some others may not). In such embodiments, the programming code of the user interface page may parse the platform agnostic field formatting code to identify the section(s) of the code corresponding to the type(s) of data associated with the user interface page. In some embodiments, the programming code of the user interface page may specify, to the remote server via the API, the type(s) of data that the user interface page is configured to obtain from users (e.g., a billing address, credit card information, etc.). As such, the remote server may return to the user device only the platform agnostic field formatting code that is associated with the specified type(s) of data.

By executing the programming code of the user interface page, the user device may then parse the platform agnostic field formatting code to extract formatting data for the type(s) of data. As discussed herein, the formatting data for each type of data may specify a number of different input data fields and the formatting rules associated with each of the different input data fields. Thus, the user device, by executing the programming code of the user interface page, may automatically generate additional programming code (e.g., in HTML and JavaScript®) that implements the input data fields and the formatting rules associated with the input data fields in the user interface page based on the extracted formatting data. Furthermore, since the additional programming code is generated dynamically by the user device when executing and/or rendering the user interface page, the additional programming code can be generated to conform with the overall look and feel of the user interface page (and of the website of the organization) (e.g., by using CSS code associated with the organization), independent of the platform agnostic field formatting code. Thus, user interface pages associated with different organizations may generate the input data fields to look different from each other based on the look and feel (e.g., CSS code) associated with the organizations.

As a user of the user device inputs data into an input data field, the additional programming code that implements the formatting rules associated with the input data field can be triggered to automatically format the data and verify the formatting of the data. For example, as the user begins to input a credit card number in the payment card input data field of the user interface page, the additional programming code can be triggered to format the credit card number. In some embodiments, the additional programming code may format the data based on the data already inserted in the input data field. For example, the additional programming code may recognize that the credit card number is associated with either an American Express® card or a VISA® card based on the first digit of the number (a '3' or a '4'). If it is an American Express® card, the additional programming code may format the data in the #### ###### ##### format, and if it is a VISA® card, the additional programming code may format the data in the #### #### #### #### format.

In another example, as the user begins to input a zip code in the zip code input data field of the user interface page, the additional programming code can be triggered to format the zip code data. In some embodiments, the additional programming code may format the data based on the data already inserted in another input data field (e.g., the country input data field). For example, if the address is a U.S. address, the additional programming code may format the data in the ##### format or the #####-#### format. If the address is a Canadian address, the additional programming code may format the data in the @#@-#@# format. If the address is an Australian address, the additional programming code may format the data in the ###-### format. In some embodiments, the additional programming code may also format the zip code data based on the data inserted in the zip code input data field (e.g., whether the first character is a numeral or an alphabet, whether the zip code data includes 5 characters, 6 characters, or 9 characters, etc.).

In some embodiments, by formatting the data, the additional programming code inserts extra characters (e.g., dashes, spaces, slashes, etc.) into the data inserted into the input data field. For example, for the payment card number input data field, the additional programming code may insert a space after the fourth digit, a space after the eighth digit (or after the tenth digit in the case of an American Express® card), and/or a space after the twelfth digit. For a zip code input data field, the additional programming code may insert a dash after the fifth digit in the case of a U.S. address, or a dash after the third character in the case of a Canadian address or an Australian address. In some embodiments, the formatted data (with the extra characters added) is presented in the corresponding input data fields on the user interface page during and after the insertion of the data. As discussed herein, the presentation of the formatted data (with the extra characters to divide a piece of data into multiple chunks) on the user interface page helps the user in providing the correct information and verifying the data.

In some embodiments, formatting the data also includes preventing the user from entering additional characters into the input data field once the maximum length of the data is reached. For example, once it is determined that nine digits have been entered into the zip code input data field, the additional programming code may deactivate the data inputting functionality of the zip code input data field such that no additional characters can be entered into the zip code input data field. Similarly, in certain instances, once it is determined that sixteen digits have been entered into the payment card number input data field, the additional programming code may deactivate the data inputting functionality of the payment card number input data field such that no additional characters can be entered into the payment card number input data field. Additionally, the leading digit of the payment card number input data field may provide a signal as to how many characters are to be expected. For example, if the number starts with a "4," "5" or "6," 16 total characters are expected as entries for Visa, Mastercard or Discover payment cards, respectively. If the number starts with a 3, however, then 15 total characters are expected as entries for an American Express payment card.

In some embodiments, the additional programming code also enforces the restrictions associated with the input data fields such that data that does not conform to the formatting rules is not transmitted to the computer server. Even though data entered into a particular input data field conforms to the length and/or the arrangement of numerals/alphabet requirements, the data might still fail the one or more restrictions associated with the input data field. For example, the payment card input data field may be associated with a restriction that the first numeral must be either a '3' or a '4.' Thus, if the first numeral of a payment card number entered by the user in the payment card input field is a digit other than a '3' or a '4,' the additional programming code may perform one or more actions based on the error. In some embodiments, the additional programming code may prevent the user from submitting the data in the input data fields (e.g., the form) to the computer server by, for example, deactivating a user interface selectable element (e.g., a button) corresponding to submitting the data. In some embodiments, the additional programming code may cause the user interface page to present an error code (e.g., from a pop-up window or highlighting the input data field that includes the erroneous data, etc.) and may also force the user to correct the erroneous data before moving onto another input data field (e.g., by preventing the user to activate a cursor in another input data field, etc.).

By formatting the data and enforcing the restrictions, the additional programming code ensures that the data obtained from the user via the user interface page has the correct formats. When it is determined that all of the required input data fields have been filled with the correct format and conformed with the restrictions, the additional programming code may activate the user interface selectable element for submitting the data to the computer server. The user may select the user interface selectable element to submit the data provided on the user interface page to the computer server for processing (e.g., for performing a transaction with the computer server). When the additional programming code detects that the user interface selectable element has been selected, the additional programming code of some embodiments may perform a scrubbing process to the data in the input data fields before submitting the processed data to the computer server. For example, the additional programming code may remove any formatting (e.g., the extra characters added to the data) performed to the data while the data is presented on the user interface page, for example, by removing all of the extra characters from the data, as those extra characters only serve the purpose of assisting the user in entering the data and are not part of the data itself. The user interface page may then transmit the processed data in a request (e.g., a web request, etc.) to the computer server.

FIG. 1 illustrates an electronic transaction system 100, within which the user interface system may be implemented according to one embodiment of the disclosure. The electronic transaction system 100 includes a service provider server 130, a formatting server 120, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the formatting server 120 and/or the service provider server 130 over the network 160. For example, the user 140 may use the user device 110 to conduct an online purchase transaction with the service provider server 130 via websites hosted by the service provider server 130 or mobile applications associated with the service provider server 130. The user 140 may also log in to a user account to access account services or conduct electronic transactions (e.g., account transfers or payments) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface application 112 (e.g., a web browser, a mobile application, etc.), which may be utilized by the user 140 to conduct electronic transactions (e.g., online payment transactions, etc.) with the service provider server 130 over the network 160. In one implementation, the user interface application 112 includes a proprietary software program (e.g., a mobile application) that provides a graphical user interface (GUI) for the user 140 to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile) maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

Even though only one user device 110 is shown in FIG. 1, it has been contemplated that one or more user devices (each similar to user device 110) may be communicatively coupled with the service provider server 130 via the network 160 within the system 100.

The formatting server 120, in various embodiments, may be maintained by a service provider associated with the service provider server 130 or a third-party data formatting service entity. The formatting server 120 may include a database 124 for storing platform agnostic field formatting code associated with one or more types of data (e.g., address data type, payment card information data type, etc.). The platform agnostic field formatting code may include, for each type of data, information that specifies a number of different input data fields required for the type of data and formatting rules associated with each of the different input data fields. The formatting rules associated with each of the different input data fields may include one or more acceptable, formats, where each format includes a length (e.g., a maximum length, a minimum length, etc.), an arrangement of one or more numerals and/or one or more alphabets (e.g., a pattern), any additional characters (e.g., dashes, spaces) inserted among the one or more numerals and/or one or more alphabets, and one or more restrictions (e.g., the first character must be a '3' or a '4', etc.). It is noted that the platform agnostic field formatting code is agnostic to computer platforms e.g., Windows® operating system, Mac® operating system, iOS® operating system, Android® operating system, etc.) and may be implemented in a manner (e.g., using XML code or a proprietary format, etc.) that can be interpreted by any type of programming language (e.g., C++, Java®, JavaScript®, Python, C #, etc.).

The formatting server 120 may also include an interface server 122 for interfacing with the service provider server 130 and/or the user device 110. For example, the formatting server 120 may provide a set of Application Programming Interfaces (APIs) that enables the user device 110 and/or the service provider server 130 to communicate with the formatting server 120. In some embodiments, the service provider server 130 may use the APIs to interact with the formatting server 120, for example, to define formatting rules for one or more types of data. The formatting server 120 may generate new platform agnostic field formatting code based on the new formatting rules. In another example, the user device 110 may use the APIs to interact with the formatting server 120, for example, to retrieve the platform agnostic field formatting code associated with one or more types of data.

The service provider server 130, in one embodiment, may be maintained by a transaction processing entity or an online service provider (e.g., an online merchant, etc.), which may provide processing for electronic transactions between the user 140 of user device 110 and one or more merchants. As such, the service provider server 130 may include a service application 138, which may be adapted to interact with the user device 110 over the network 160 to facilitate the searching, selection, purchase, payment of items, and/or other services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the data server 134 may store a log-in page and is configured to serve the log-in page to users for logging into user accounts of the users to access various service provided by the service provider server 130. The data server 134 may also include other electronic pages associated with the different services (e.g., electronic transaction services, etc.) offered by the service provider server 130. As a result, a user may access a user account associated with the user and access various services offered by the service provider server 130, by generating HTTP requests directed at the service provider server 130. It is noted that at least some of the user interface pages (e.g., webpages, mobile application pages, etc.) stored by the interface server 132 may be configured to obtain user data from users (e.g., the user 140) when the user interface pages are rendered and presented on user devices (e.g., the user device 110). However, these user interface pages, as stored by the interface server 132, may not include any input data fields (e.g., electronic forms, etc.). Instead, each of these interface pages may include programming code (e.g., scripts such as JavaScript®, etc.), that when executed by a user device (e.g., the user device 110), may configure the user device 110 to retrieve platform agnostic field formatting code associated with one or more types of data. The programming code may further cause the user device 110 to generate additional programming code for implementing the input data fields based on the platform agnostic field formatting code, such that the UI Application 112 may present the dynamically generated input data fields on the user device 110.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

User profile information may be compiled or determined in any suitable way. In some instances, some information is solicited when a user first registers with a service provider. The information might include demographic information, a survey of purchase interests, and/or a survey of past purchases. In other instances, information may be obtained from other databases. In certain instances, information about the user and products purchased are collected as the user shops and purchases various items, which can also be used to determine whether a request is valid or fraudulent.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

Figure 2:
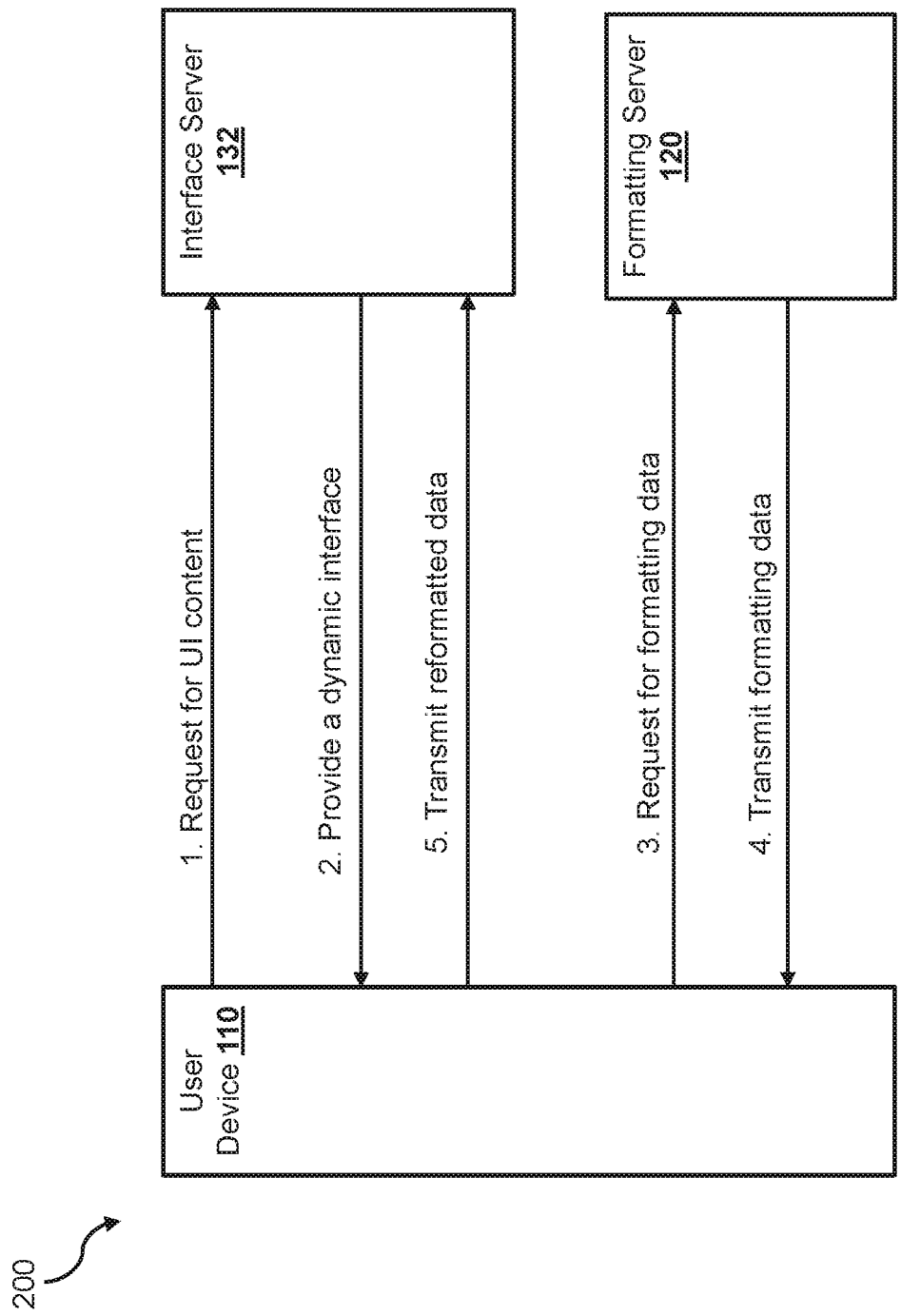
FIG. 2 illustrates data flow for dynamically generating a user interface page according to an embodiment of the present disclosure.
Figure 3A:
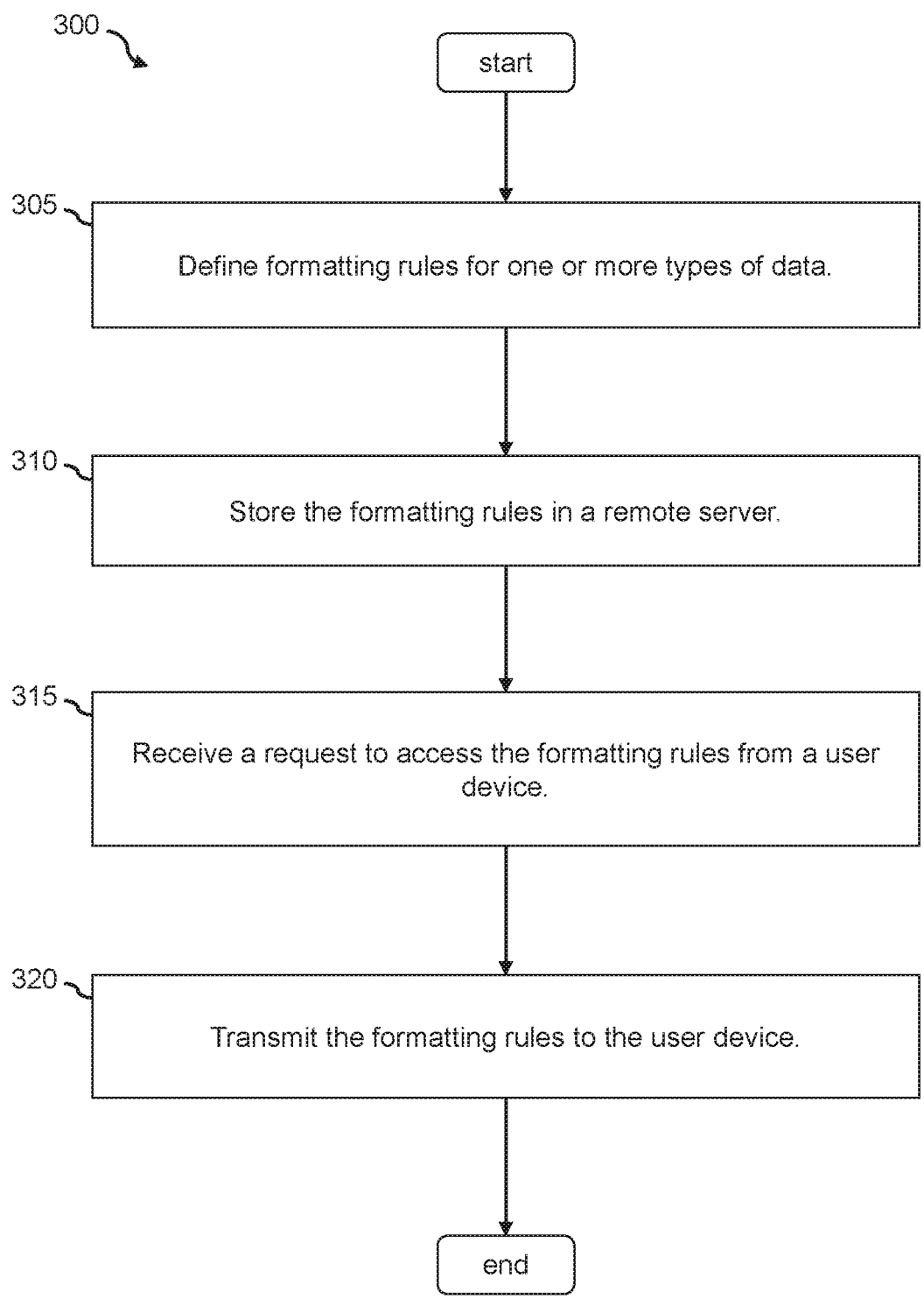
FIG. 3A is a flowchart showing a process of managing platform agnostic field formatting code according to an embodiment of the present disclosure.

FIG. 2 illustrates an exemplary data flow 200 among the user device 110, the interface server 132, and the formatting server 120, and will be described herein by reference to FIGS. 3A and 3B, which illustrates a process 300 for providing platform agnostic field formatting code to user devices and a process 322 for dynamically generating programming code for implementing input data fields in a user interface that automatically verifies formatting of input data based on platform agnostic field formatting code, respectively. In some embodiments, the process 300 may be performed by the formatting server 120. The process 300 begins by defining (at step 305) formatting rules for one or more types of data. As discussed herein, the formatting server 120 of some embodiments may provide a set of Application Programming Interfaces (APIs) that enables the user device 110 and/or the service provider server 130 to communicate with the formatting server 120. In some embodiments, the service provider server 130 or other service provider servers associated with different service providers (e.g., other merchants, etc.) may use the APIs to interact with the formatting server 120 to define formatting information for one or more types of data. For example, via the APIs, the service provider server 130 may define formatting information for a payment card information data type. In this example, the service provider server 130 may provide to the formatting server 120 information such as a number of input data fields required for obtaining payment card information, such as a card number input data field, a security code input data field, a cardholder name input data field, and an expiration date input data field. The service provider server 130 may also provide formatting rules such as a length (e.g., a maximum length, a minimum length, etc.), an arrangement of one or more numerals and/or one or more alphabets, any additional characters (e.g., dashes, spaces) to be inserted among the one or more numerals and/or one or more alphabets, and one or more restrictions (e.g., the first character must be a '3' or a '4', etc.) for each of the different input data fields. The formatting server 120 may then generate platform agnostic field formatting code for the data type (e.g., the payment card information data type) based on the information received from the service provider server 130.

FIG. 4 illustrates an exemplary platform agnostic field formatting code 400 generated for a payment card number input data field of the payment card information data type. In some embodiments, the platform agnostic field formatting code 400 may be generated by the formatting server 120. The platform agnostic field formatting code is agnostic to computer platforms (e.g., Windows® operating system, Mac® operating system, iOS® operating system, Android® operating system, etc.) and can be accessed by programming code implemented in different programming languages (e.g., C++, Java®, JavaScript®, Python, C #, etc.). In some embodiments, the platform agnostic field formatting code 400 may be implemented using a standard markup language for storing and transporting data, such as XML. In some embodiments, the platform agnostic field formatting code 400 may be implemented as a text file with data (e.g., lengths, restrictions, arrangements, or other formatting rules, etc.) stored according to a predetermined format. In this example, the platform agnostic field formatting code 400 includes multiple data fields that specify different formatting information associated with the payment card number input data field. For example, the platform agnostic field formatting code 400 includes a name for the payment card number input data field (e.g., "Account Number"), a maximum length for the payment card number input data field (e.g., "17"), a minimum length for the payment card number input data field (e.g., "17"), a Boolean value indicating whether this input data field is required for the payment card information data type submission (e.g., "true"), one or more arrangement patterns.

As shown in FIG. 4, each one of the arrangement patterns may be associated with a prerequisite requirement. For example, the pattern #### #### #### #### is associated with the requirement that the first digit of the data being a numeral '4' (corresponding to a VISA® card) or a number '5' followed by a second digit being one of the numerals '1' to '5' (corresponding to a MasterCard® card). The pattern #### ###### ##### is associated with the requirement that the first digit of the data being a numeral '3' followed by a second digit being one of the numerals '4' or '7' (corresponding to an American Express® card). The associated requirements may be expressed in regular expression, as shown herein. The platform agnostic field formatting code 400 as shown in FIG. 4 is only a portion of platform agnostic field formatting code generated for the payment card information data type, as the formatting server 120 may generate other platform agnostic field formatting code for other input data fields (e.g., name, security code, expiration date, etc.) for the payment card information data type. Furthermore, the formatting server 120 may also use the same mechanism to generate platform agnostic field formatting code for other data types (e.g., address, username and password, personal information, etc.). Once the formatting rules are defined, the process 300 stores (at step 310) the formatting rules in a remote server. For example, the formatting server 120 may store the platform agnostic field formatting code 400 and other platform agnostic field formatting code generated for other input data fields for the payment card information data type and for other data types in the database 124 of the formatting server 120, which may be a remote server separated from the service provider server 130 or may be part of the service provider server 130.

In some embodiments, the formatting server 120 may store the platform agnostic field formatting code generated for different data types in different data structure (e.g., separate files). In some embodiments, the formatting server 120 may store the platform agnostic field formatting code generated for different data types in the same file. The process 300 then receives (at step 315) a request to access the formatting rules from a user device and transmits (at step 320) the formatting rules to the user device. For example, a user (e.g., the user 140) may use the UI application 112 to navigate user interface pages (e.g., webpages, mobile application pages, etc.). The user 140 may use the UI application 112 to access a particular user interface page (e.g., clicking on a link of another user interface page, etc., as illustrated in step 1 of the data flow 200), and the particular user interface page may be configured to obtain information from the user 140. For example, the user 140 may initiate, through the UI application 112, an electronic transaction (e.g., a payment transaction, a new account onboarding transaction, etc.) with the service provider server 130. Thus, by clicking on the link, the UI application 112 transmits a request for UI content (e.g., a HTTP request, etc.) to the interface server 132 of the service provider server 130. As discussed herein, the interface server 132 may store data (e.g., files such as HTML files, etc.) associated with various user interface pages. At least some of the user interface pages are configured to obtain information from a user to facilitate processing of various transactions (e.g., a user interface page for obtaining payment card information from the user to initiate a payment transaction, a user interface page for obtaining an address from the user to initiate a purchase transaction, etc.).

Conventionally, these user interface pages may include programming code (e.g., HTML code) that implements one or more input data fields (e.g., an electronic form) for enabling users to provide the requested data (e.g., an address, payment card information, etc.). However, according to various embodiments of the disclosure, the service provider server 130 may generate or otherwise store the user interface pages that are configured to obtain information from users to not include the programming code that implements the one or more input data fields. Instead, the service provider server 130 may include, in each of these user interface pages, specific programming code for retrieving platform agnostic field formatting code associated with one or more data types from the formatting server 120, and for dynamically generating additional programming code that implements the one or more input data fields in the user interface page based on the retrieved platform agnostic field formatting code. The programming code may include calling APIs associated with the formatting server 120 for retrieving the platform agnostic field formatting code. As such, in some embodiments, at least a portion of the programming code may be provided by the formatting server 120.

When the interface server 132 of the service provider server 130 receives a request for one of these user interface pages (e.g., a HTTP request, a RESTAPI request, etc.) from the user device 110, the interface server 132 may transmit the requested user interface page (e.g., a HTML file) that includes the programming code to the user device 110 (as illustrated in step 2 of the data flow 200). Upon receiving the user interface page, the UI application 112 of the user device 110 may execute and/or render the user interface page. During the execution and/or rendering of the user interface page, the UI application 112 may execute the programming code included in the user interface page. By executing the programming code, the UI application 112 may transmit a request, to the formatting server 120, for formatting rules (e.g., platform agnostic field formatting code) associated with one or more data types (as illustrated in step 3 of the data flow 200. For example, when the user interface page is configured to obtain an address of the user, the UI application 112 may transmit a request for formatting rules associated with the address data type. In another example, when the user interface page is configured to obtain payment card information from the user, the UI application 112 may transmit a request for formatting rules associated with the payment card information data type.

Thus, the formatting server 120 may receive a request for formatting rules from a user device (e.g., the user device 110). In response to receiving the request, the formatting server 120 may transmit the requested formatting rules to the user device 110 (as illustrated in step 4 of the data flow 200). In some embodiments, the request from the user device 110 may specify the data type(s) (e.g., an address data type, a payment card information data type, etc.) for which the formatting rules are requested. Thus, the formatting server 120 may retrieve the file(s) that store the platform agnostic field formatting code associated with the requested data type(s) and transmit the retrieved file(s) to the user device 110. In some embodiments, the request from the user device 110 may not specify any data type, and the formatting server 120 may retrieve the file(s) that store the platform agnostic field formatting code associated with all data type(s) and transmit the retrieved file(s) to the user device 110.

Figure 3B:
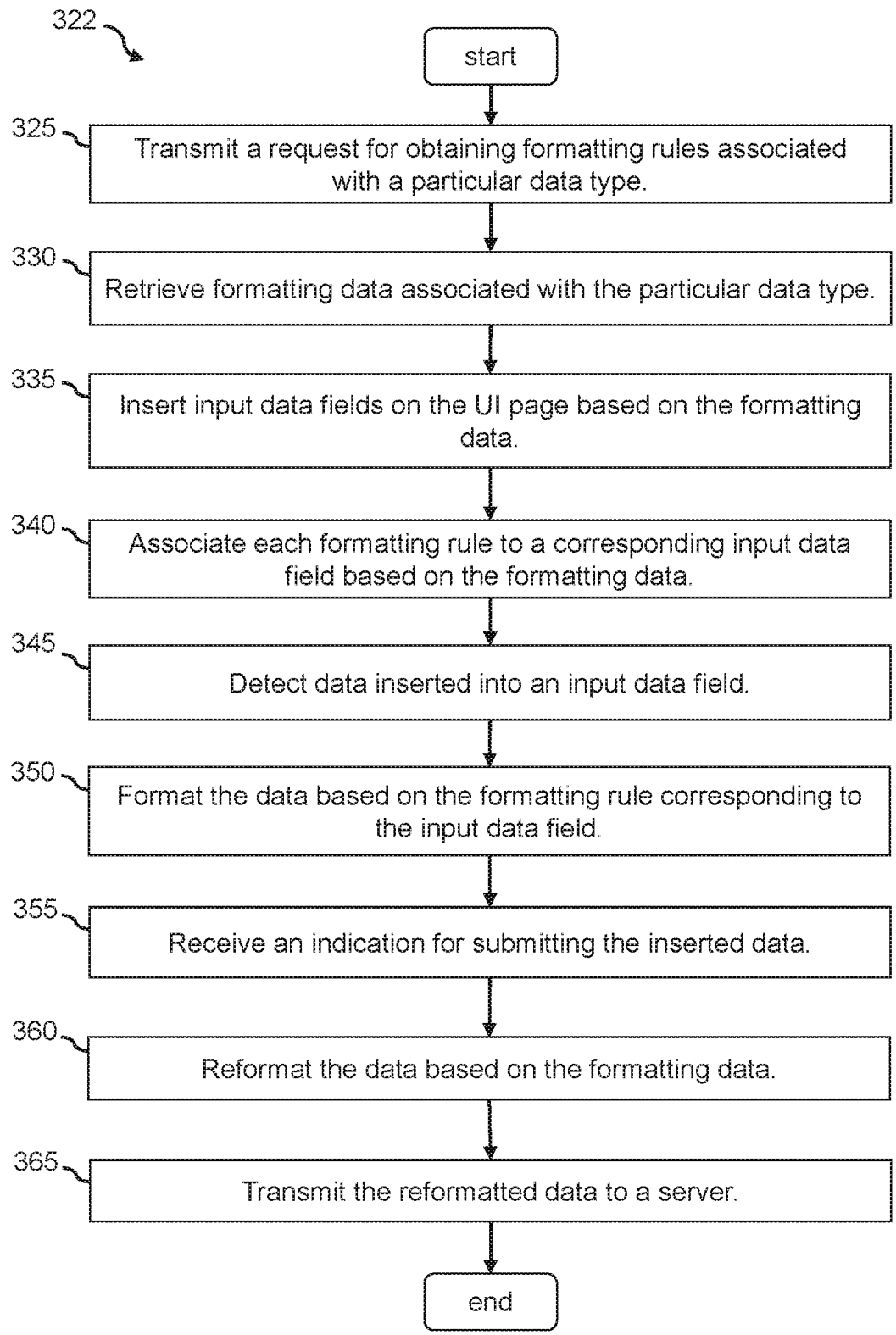
FIG. 3B is a flowchart showing a process of dynamically generating a user interface page using platform agnostic field formatting code according to an embodiment of the present disclosure.

Referring to FIG. 3B, the process 322 dynamically generates programming code for implementing input data fields in a user interface that automatically verifies formatting of input data based on platform agnostic field formatting code. The process 322 may be performed by the user device 110, the formatting server 120, and/or the service provider server 130. The process 322 begins by transmitting (at step 325) a request for obtaining formatting rules associated with a particular data type and retrieving (at step 330) formatting data associated with the particular data type. As discussed herein, as the UI application 112 of the user device 110 executes the programming code of the user interface page, the UI application 112 may transmit a request for formatting rules associated with one or more data types to the formatting server 120. The UI application 112 may receive platform agnostic field formatting code associated with the one or more data types. The platform agnostic field formatting code associated with the one or more data types may be stored in one or more data files (e.g., one data file for each data type). Furthermore, the platform agnostic field formatting code associated with each data type may include information that specifies a number of different input data fields required for the type of data and formatting rules associated with each of the different input data fields. The formatting rules associated with each of the different input data fields may include one or more acceptable formats, where each format includes a length (e.g., a maximum length, a minimum length, etc.), an arrangement of one or more numerals and/or one or more alphabets (e.g., a pattern), any additional characters (e.g., dashes, spaces) inserted among the one or more numerals and/or one or more alphabet letters, and one or more restrictions (e.g., the first character must be a '3' or a '4', etc.). For example, for an address type of data, the platform agnostic field formatting code may specify that an address may include a street address input data field, a city input data field, a state input data field, a zip code input data field, and a country input data field. The platform agnostic field formatting code may also include different formatting rules for the different input data fields. For example, for the zip code input data field, the formatting rules may include one or more acceptable formats, including a format of ##### and a format of #####-#### for U.S. addresses, a format of @#@-#@# for Canadian addresses, a format of ###-### for Australian addresses, and possibly other zip code formats corresponding to other countries. In another example, for a payment card information type of data, the platform agnostic field formatting code may specify that the payment card information may include a card number input data field, a security code input data field, a cardholder name input data field, and an expiration date input data field. The platform agnostic field formatting code may also include different formatting rules for the different input data fields. For example, for the payment card number input data field, the formatting rules may include one or more acceptable formats, including a format of #### ###### ##### for American Express® payment cards and a format of #### #### #### #### for VISA® and MasterCard® payment cards. Thus, the platform agnostic field formatting code associated with each data type may include one or more code sections similar to the code 400 for each input data fields.

Thus, upon receiving the platform agnostic field formatting code, the UI application 112 executing the programming code of the user interface page may parse the platform agnostic field formatting code to extract formatting information associated with the particular data type. The process 322 then inserts (at step 335) input data fields on the UI page based on the formatting data and associates (at step 340) each formatting rule with a corresponding input data field based on the formatting data. As discussed herein, the formatting data for each type of data may specify a number of different input data fields and the formatting rules associated with each of the different input data fields. Thus, the UI application 112 of the user device 110, by executing the programming code of the user interface page, may automatically generate additional programming code (e.g., in HTML and JavaScript®) that implements the input data fields and the formatting rules associated with the input data fields in the user interface page based on the extracted formatting data.

Figure 5:
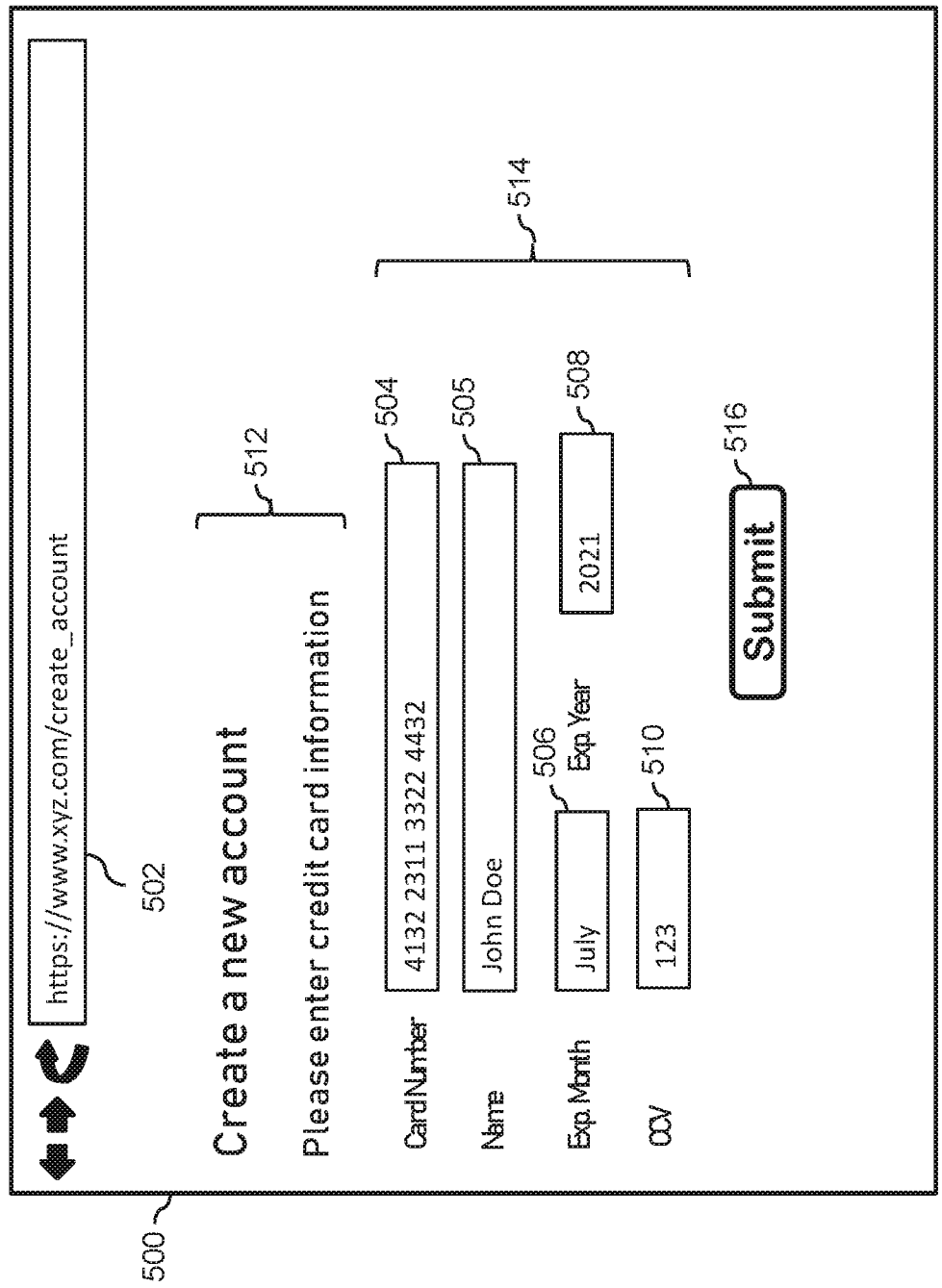
FIG. 5 illustrates an exemplary user interface page that is dynamically generated using platform agnostic field formatting code according to an embodiment of the present disclosure.

FIG. 5 illustrates a user interface page 500 (e.g., a webpage) having a network address 502 "https://www.xyz.com/create_account". The UI application 112 of the user device 110 may have downloaded the user interface page 500 from the interface server 132 of the service provider server 130 based on a web request (or retrieved the user interface page 500 from a memory of the user device 110). The user interface page 500 may be configured to obtain credit card information from users for creating a new user account. As shown, the user interface page 500 includes various user interface elements such as text within a UI section 512. However, the user interface page 500 that was received from the interface server 132 may not include any input data fields for obtaining credit card information (the UI section 514). Instead, the user interface page 500 may include programming code for retrieving formatting data from the formatting server 132. Thus, the UI application 112 executing the programming code may request formatting data associated with payment card information data type from the formatting server 120 and receives the formatting data, for example, in a data file (e.g., an XML file, a text file, etc.). Upon extracting the formatting information from the received data file, the UI application 112 executing the programming code may generate additional programming code that implements the input data fields and the formatting rules associated with the payment card information data type based on the extracted information. For example, since the platform agnostic field formatting code associated with the payment card information data type specifies that the payment card information may include a card number input data field, a security code input data field, a cardholder name input data field, and an expiration date input data field, the UI application 112 executing the programming code may generate additional programming code that implements the various input data fields, such as the card number input data field 504, the cardholder name input data field 505, an expiration month input data field 506, the expiration year input data field 508, and the security code input data field 510.

It is noted that since the additional programming code is generated dynamically by the user device during execution and/or rendering of the user interface page 500, the additional programming code can be generated to conform with the overall look and feel of the user interface page (and of the website of the organization) (e.g., by using CSS code associated with the organization), independent of the platform agnostic field formatting code. For example, in this example, the input data fields 504-510 have the look and feel that is consistent with the rest of the user interface page 500 (e.g., the fonts of the names associated with the input data fields are consistent with the fonts of the text in section 512). Furthermore, user interface pages associated with different organizations may generate the input data fields to look different from each other based on the look and feel (e.g., CSS code) associated with the organizations, even though the pages are generated based on the same platform agnostic field formatting code.

As discussed herein, the additional programming code also includes formatting rules and restrictions associated with each of the input data fields 504-510. For example, the formatting rules and restrictions associated with the payment card number input data field 504 may include the formatting rules and restrictions from the platform agnostic field formatting code 400. The process 322 then detects (at step 345) data inserted into an input data field and formats (at step 350) the data based on the formatting rule(s) corresponding to the input data field. Thus, as the user 140 of the user device 110 inputs data into an input data field, the additional programming code that implements the formatting rules associated with the input data field can be triggered to automatically format the data and verify the formatting of the data. For example, as the user 140 begins to input a credit card number in the payment card input data field 504 of the user interface page 500, the additional programming code can be triggered to format the credit card number.

In some embodiments, the additional programming code may format the data based on the data already inserted in the input data field. For example, the additional programming code may recognize that the credit card number is associated with either an American Express® card or a VISA® card based on the first digit of the number (a '3' or a '4'). If it is an American Express® card, the additional programming code may format the data in the #### ###### ##### format, and if it is a VISA® card, the additional programming code may format the data in the (#### #### #### ####) format. In this example, since the credit card number entered into the payment card number input data field 504 begins with a numeral '4,' the additional programming code formats the credit card number according to the pattern #### #### #### #### as specified in the platform agnostic field formatting code, by inserting a space after every four digits. The formatted data (with the extra characters such as spaces added) is presented in the corresponding input data fields on the user interface page 500 during and after the insertion of the data. As discussed herein, the presentation of the formatted data (with the extra characters to divide a piece of data into multiple chunks) on the user interface page helps the user in providing the correct information and verifying the data.

In some embodiments, formatting the data also includes preventing the user from entering additional characters into the input data field once the maximum length of the data is reached. For example, once it is determined that sixteen digits have been entered into the payment card number input data field 504, the additional programming code may deactivate the data inputting functionality of the payment card number input data field 504 such that no additional characters can be entered into the payment card number input data field.

In some embodiments, the additional programming code also enforces the restrictions associated with the input data fields such that data that does not conform to the formatting rules is not transmitted to the computer server. Even though data entered into a particular input data field conforms to the length and/or the arrangement of numerals/alphabet requirements, the data might still fail the one or more restrictions associated with the input data field. For example, the payment card input data field 504 may be associated with a restriction that the first numeral must be either a '3' or a '4.' Thus, if the first numeral of a payment card number entered by the user in the payment card input field 504 is a digit other than a '3' or a '4,' the additional programming code may perform one or more actions based on the error. In some embodiments, the additional programming code may prevent the user from submitting the data in the input data fields (e.g., the form) to the service provider server 130 by, for example, deactivating a user interface selectable element (e.g., a button 516 for submitting the form). In some embodiments, the additional programming code may cause the user interface page 500 to present an error code (e.g., from a pop-up window or highlighting the input data field that includes the erroneous data, etc.) and may also require the user to correct the erroneous data before moving onto another input data field (e.g., by preventing the user to activate a cursor in another input data field, etc.). By formatting the data and enforcing the restrictions, the additional programming code ensures that the data obtained from the user via the user interface page has the correct formats. When it is determined that all of the required input data fields have been filled with the correct format and conformed with the restrictions, the additional programming code may activate the user interface selectable element (e.g., the button 516) for submitting the data to the service provider server 130.

Figure 6:
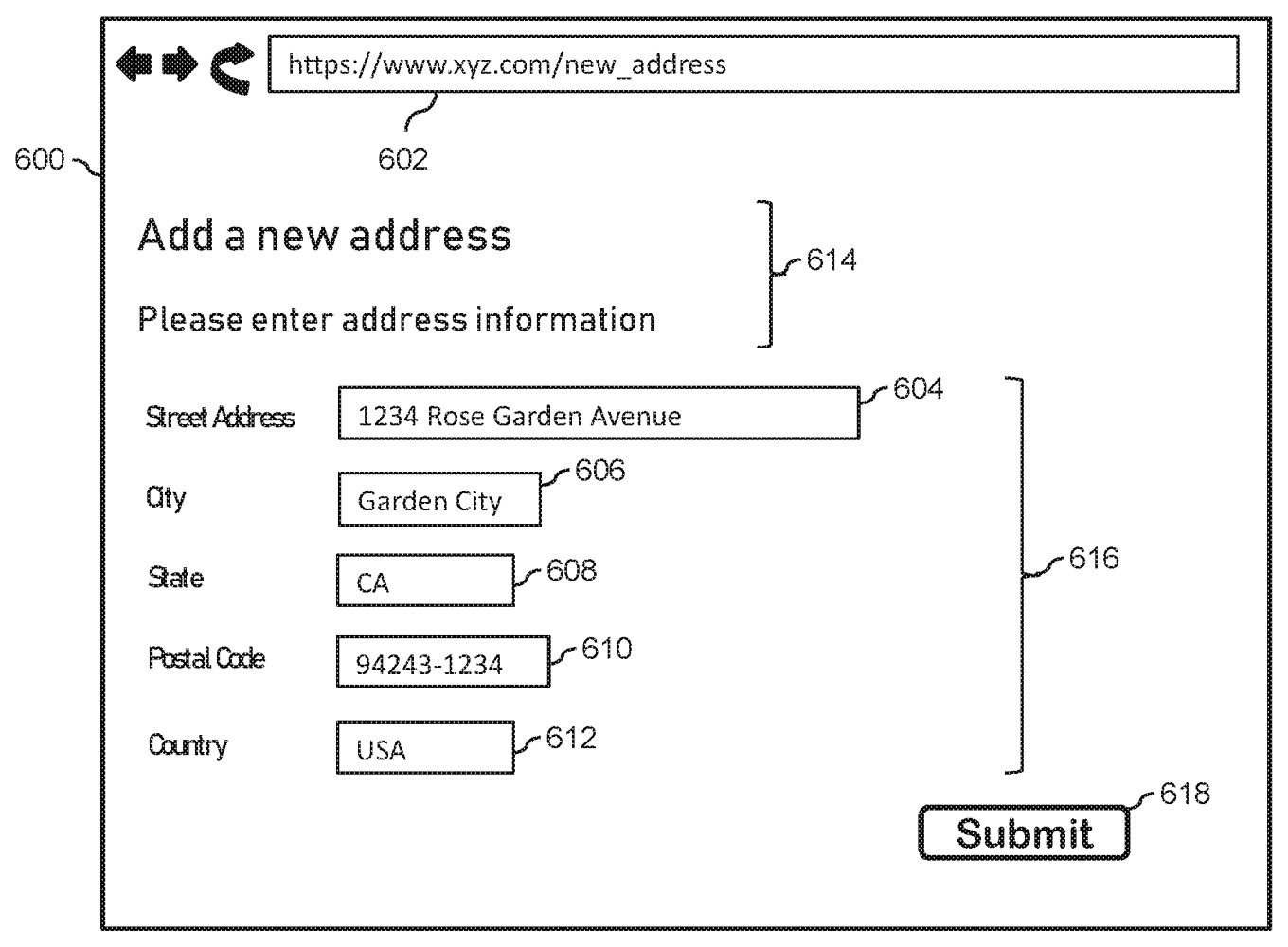

FIG. 6 illustrates another user interface page 600 (e.g., a webpage) having a network address 502 "https://www.xyz.com/new_address". The UI application 112 of the user device 110 may have downloaded the user interface page 500 from the interface server 132 of the service provider server 130 based on a web request. The user interface page 600 may be configured to obtain address information from users. As shown, the user interface page 600 include various user interface elements such as text within a UI section 614. However, the user interface page 600 that was received from the interface server 132 may not include any input data fields for obtaining address information (the UI section 616). Instead, the user interface page 600 may include programming code for retrieving formatting data from the formatting server 132. Thus, the UI application 112 executing the programming code may request formatting data associated with address information data type from the formatting server 120 and receives the formatting data, for example, in a data file (e.g., an XML file, a text file, etc.). Upon extracting the formatting information from the received data file, the UI application 112 executing the programming code may generate additional programming code that implements the input data fields and the formatting rules associated with the address information data type based on the extracted information. For example, since the platform agnostic field formatting code associated with the address information data type specifies that the address information may include a street address input data field, a city input data field, a state input data field, a zip code input data field, and a country input data field, the UI application 112 executing the programming code may generate additional programming code that implements the various input data fields, such as the street address input data field 604, the city input data field 606, the state input data field 608, the zip code input data field 610, and the country input data field 612.

As discussed herein, the additional programming code also includes formatting rules and restrictions associated with each of the input data fields 604-612. For example, for the zip code input data field, the formatting rules may include one or more acceptable formats, including a format of ##### and a format of #####-#### for U.S. addresses, a format of @#@-#@# for Canadian addresses, a format of ###-### for Australian addresses, and possibly other zip code formats corresponding to other countries. Thus, as the user begins to input a zip code in the zip code input data field of the user interface page, the additional programming code can be triggered to format the zip code data. In some embodiments, the additional programming code may format the data based on the data already inserted in another input data field (e.g., the country input data field). For example, if the address is a U.S. address, the additional programming code may format the data in the ##### format or the #####-#### format. If the address is a Canadian address, the additional programming code may format the data in the @#@-#@# format. If the address is an Australian address, the additional programming code may format the data in the #### format. In some embodiments, the additional programming code may also format the zip code data based on the data inserted in the zip code input data field 610 (e.g., whether the first character is a numeral or an alphabet, whether the zip code data includes 5 characters, 6 characters, or 9 characters, etc.).

In this example, since the zip code entered into the zip code input data field 610 includes nine numerals, the additional programming code formats the credit card number according to the pattern #####-#### as specified in the platform agnostic field formatting code. In some embodiments, by formatting the data, the additional programming code inserts extra characters (e.g., dashes, spaces) into the data inserted into the input data field. Thus, the additional programming code may format the zip code inserted into the zip code input data field 610 by inserting a dash after the fifth digit. The formatted data (with the extra dash added) is presented in the corresponding input data fields on the user interface page 600 during and after the insertion of the data.

In some embodiments, formatting the data also includes preventing the user from entering additional characters into the input data field once the maximum length of the data is reached. For example, once it is determined that the address is a U.S. address (e.g., based on the data inserted into the country input data field 612), the additional programming code may prevent any alphabet from being entered into the zip code input data field 610. Furthermore, if it is determined that nine digits have been entered into the zip code input data field 610, the additional programming code may deactivate the data inputting functionality of the zip code input data field 610 such that no additional characters can be entered into the zip code input data field 610.

The process 322 then receives (at step 355) an indication for submitting the inserted data, reformats (at step 360) the data based on the formatting data, and transmits (at step 365) the reformatted data to a server. For example, the user 140 may select the user interface selectable element (e.g., the button 516 on the user interface page 500 or the button 618 on the user interface page 600) to submit the data provided on the user interface page (e.g., the user interface page 500 or 600) to the interface server 132 for processing (e.g., for performing a transaction with the service provider server 130). When the additional programming code detects that the user interface selectable element (e.g., the button 516 or 618) has been selected, the additional programming code of some embodiments may perform a scrubbing process on the data in the input data fields before submitting the processed data to the interface server 132. For example, the additional programming code may remove any formatting (e.g., the extra characters such as spaces or dashes added to the data) performed on the data while the data is presented on the user interface page, for example, by removing all of the extra characters from the data, as those extra characters only serve the purpose of assisting the user in entering the data and are not part of the data itself. The UI application 112 may then transmit the processed data in a request (e.g., a web request, etc.) to the interface server 132 (as illustrated in step 5 of the data flow 200).

FIG. 7 is a block diagram of a computer system 700 suitable for implementing one or more embodiments of the present disclosure, including the service provider server 130, the formatting server 120, and the user device 110. In various implementations, the user device 110 may include a mobile cellular phone, personal computer (PC), laptop, wearable computing device, etc. adapted for wireless communication, and each of the service provider server 130 and the formatting server 120 may include a network computing device, such as a server. Thus, it should be appreciated that the devices 110, 120, and 130 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account or a checkout page for purchasing an item from a merchant. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid-state drive, a hard drive). The computer system 700 performs specific operations by the processor 714 and other components by executing one or more sequences of instructions contained in the system memory component 710. For example, the processor 714 can perform the position detection of webpage elements described herein according to the processes 300 and 322.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
receiving, from a service provider server associated with a service provider, first programming code associated with a user interface page for display on a user device associated with a user, wherein the first programing code is computer platform and geographic region agnostic, wherein the user interface page is configured to obtain a particular type of information from the user, and wherein the user interface page comprises a submit element for submitting the particular type of information to the service provider server;
determining a computer platform and a geographical region associated with the user device;
retrieving, from a remote server different from the service provider server and based on executing the first programming code associated with the user interface page, a text file comprising formatting data associated with formatting a plurality of input data fields for obtaining the particular type of information according to a region specific format corresponding to the geographical region associated with the user device, wherein the formatting data specifies a plurality of data elements associated with the particular type of information and formatting rules associated with each of the plurality of data elements according to the region specific format;

extracting the formatting data based on parsing the text file;

dynamically generating second programming code that implements the plurality of input data fields corresponding to the plurality of data elements based on the extracted formatting data, wherein the second programming code is specific to the computer platform associated with the user device;

programmatically associating each of the formatting rules with a corresponding input data field in the plurality of input data fields;

rendering, based on executing the second programming code, the plurality of input data fields formatted according to the region specific format as part of the user interface page on the user device;

deactivating, based on executing the second programming code, the submit element of the user interface page; and in response to detecting user data inserted into a particular input data field in the plurality of input data fields, automatically formatting the user data according to one or more of the formatting rules associated with the particular input data field.

2. The system of claim 1, wherein the formatting comprises inserting a character into the user data in the particular input data field.

3. The system of claim 2, wherein the character comprises at least one of a space character, a dash character, or a slash character.

4. The system of claim 1, wherein the operations further comprise:

determining that a plurality of user data inserted into the plurality of input data fields satisfies the formatting rules; and in response to determining that the plurality of user data satisfies the formatting rules, re-activating the submit element of the user interface page.

5. The system of claim 4, wherein the operations further comprise:

formatting the plurality of user data in the plurality of input data fields based on the associated formatting rules; and displaying the formatted plurality of user data on the user interface page.

6. The system of claim 5, wherein the operations further comprise:

reformatting the formatted plurality of user data; and in response to receiving a selection of the submit element, transmitting the reformatted plurality of user data to the service provider server.

7. The system of claim 1, wherein the one or more of the formatting rules specifies a plurality of data patterns, wherein each of the plurality of data patterns represents an arrangement of one or more numerals and/or one or more alphabet letters, and wherein the operations further comprise:

detecting the user data inserted into the first data particular input data field; and selecting, from the plurality of patterns, a first pattern based on the user data, wherein the formatting the user data is performed according to the first pattern.

8. A method, comprising:

receiving, from a web server by one or more hardware processors of a user device associated with a user, first programming code associated with electronic content for display on the user device, wherein the first programing code is computer platform and geographic region agnostic, wherein the electronic content is configured to obtain a particular type of information from the user, and wherein the electronic content comprises a submit element for submitting the particular type of information to the web server;

determining, by the one or more hardware processors, a computer platform and a geographical region associated with the user device;

retrieving, by the one or more hardware processors from a remote server different from the web server and based on executing the first programming code, a text file comprising formatting data associated with formatting one or more data input elements for obtaining the particular type of information according to a region specific format corresponding to the geographical region associated with the user device, wherein the formatting data specifies one or more data fields associated with the particular type of information and formatting rules associated with each of the one or more data fields according to the region specific format;

extracting, by the one or more hardware processors, the formatting data based on parsing the text file;

dynamically generating, by the one or more hardware processors, second programming code that implements the one or more data input elements of the electronic content based on the formatting data, wherein the second programming code is specific to the computer platform associated with the user device;

rendering, by the one or more hardware processors based on executing the second programming code, the one or more data input elements as part of the electronic content on the user device;

deactivating, by the one or more hardware processors based on executing the second programming code, the submit element of the electronic content; and in response to detecting user data inserted into a first data input element in the plurality of data input elements, automatically formatting the user data according to a first one of the formatting rules associated with the first data input element.

9. The method of claim 8, wherein the one or more data input elements corresponds to the one or more data fields, and wherein the method further comprises programmatically associating each of the formatting rules with a corresponding data input element in the one or more data input elements.

10. The method of claim 8, wherein the first one of the formatting rules specifies a plurality of data patterns, wherein each of the plurality of data patterns represents an arrangement of one or more numerals and/or one or more alphabet letters, and wherein the method further comprises:

detecting the user data inserted into the first data input element; and selecting, from the plurality of patterns, a first pattern based on the user data, wherein the formatting the user data is performed according to the first pattern.

11. The method of claim 8, wherein the formatting the user data comprises inserting a non-numeric and non-alphabetic character into the user data based on the first pattern.

12. The method of claim 11, wherein the non-numeric and non-alphabet character comprises at least one of a dash character, a space character, or a slash character.

13. The method of claim 8, wherein the first one of the formatting rules specifies a data restriction, and wherein the method further comprises:

determining that the user data inserted into the first data input element fails to conform with the data restriction; and in response to determining that the user data fails to conform with the data restriction, performing an action on the electronic content.

14. The method of claim 13, wherein the action comprises presenting an error message.

15. The method of claim 13, wherein the data restriction comprises at least one of a length or an arrangement of one or more numerals and/or one or more alphabet letters.

16. A non-transitory machine-readable medium having stored thereon machine-readable instructions executable to cause a machine to perform operations comprising:

obtaining, from a service provider server, first programming code associated with user interface content for display on a user device associated with a user, wherein the first programming code is computer platform and geographic region agnostic, wherein the user interface content is configured to obtain a particular type of information from the user, and wherein the user interface content comprises a submit element for submitting the particular type of information to the service provider server;

determining a computer platform and a geographical region associated with the user device;

retrieving, from a remote server different from the service provider server and based on executing first programming code associated with the user interface content, a file comprising formatting data associated with formatting a plurality of input data fields for obtaining the particular type of information according to a region specific format corresponding to the geographical region associated with the user device, wherein the formatting data specifies a plurality of data elements associated with the particular type of information and formatting rules associated with each of the plurality of data elements according to the region specific format;

dynamically generating second programming code that implements the plurality of input data fields corresponding to the plurality of data elements based on the formatting data, wherein the second programming code is specific to the computer platform associated with the user device;

programmatically associating each of the formatting rules with a corresponding input data field in the plurality of input data fields;

rendering, based on executing the second programming code, the plurality of input data fields formatted according to the region specific format as part of the user interface content on the user device;

deactivating, based on executing the second programming code, the submit element of the user interface page; and in response to detecting user data inserted into a particular input data field in the plurality of input data fields, automatically formatting the user data according to one or more of the formatting rules associated with the particular input data field.

17. The non-transitory machine-readable medium of claim 16, wherein the user interface content is part of an application of the user device.

18. The non-transitory machine-readable medium of claim 16, wherein the user interface content is a webpage hosted by the service provider.

19. The non-transitory machine-readable medium of claim 16, wherein the particular type of information comprises at least one of an address, payment card information, or identification information.

20. The non-transitory machine-readable medium of claim 16, wherein the operations further comprise:

detecting a plurality of user data inserted into the plurality of input data fields of the user interface content; and in response to determining that the plurality of user data complies with the formatting rules associated with the plurality of input data fields, re-activating the submit element of the user interface content.

* * * * *